(12) United States Patent
Risse et al.

(10) Patent No.: US 10,160,427 B2
(45) Date of Patent: Dec. 25, 2018

(54) METHOD FOR ESTABLISHING A WIRELESS CONNECTION

(71) Applicant: WABCO GmbH, Hannover (DE)

(72) Inventors: Rainer Risse, Pattensen-Reden (DE); Axel Stender, Hameln (DE); Norbert Witte, Lauenau (DE)

(73) Assignee: WABCO GmbH, Hannover (DE)

( * ) Notice: Subject to any disclaimer, the term of this patent is extended or adjusted under 35 U.S.C. 154(b) by 82 days.

(21) Appl. No.: 15/127,878

(22) PCT Filed: Feb. 27, 2015

(86) PCT No.: PCT/EP2015/000468
§ 371 (c)(1),
(2) Date: Sep. 21, 2016

(87) PCT Pub. No.: WO2015/144284
PCT Pub. Date: Oct. 1, 2015

(65) Prior Publication Data
US 2017/0088104 A1    Mar. 30, 2017

(30) Foreign Application Priority Data
Mar. 22, 2014    (DE) ........................ 10 2014 004 182

(51) Int. Cl.
*B60T 7/00* (2006.01)
*B60T 7/20* (2006.01)
(Continued)

(52) U.S. Cl.
CPC ...... *B60T 7/16* (2013.01); *B60T 7/20* (2013.01); *B60T 8/171* (2013.01); *H04L 67/12* (2013.01); *H04W 12/08* (2013.01); *H04W 76/10* (2018.02)

(58) Field of Classification Search
None
See application file for complete search history.

(56) References Cited

U.S. PATENT DOCUMENTS 6,501,376 B2    12/2002    Dieckmann et al.
7,911,330 B1 *   3/2011    Perten ............... B60Q 1/305
                                              280/DIG. 14
(Continued)

FOREIGN PATENT DOCUMENTS

DE          10255301 A1     6/2004
DE       102011004959 A1    9/2011
(Continued)

OTHER PUBLICATIONS

PCT/EP2015/000468 International Search Report dated Jun. 9, 2015, 4 pages.
(Continued)

*Primary Examiner* — Thomas G Black
*Assistant Examiner* — Demetra R Smith-Stewart
(74) *Attorney, Agent, or Firm* — Warner Norcross & Judd LLP

(57) ABSTRACT

A method for establishing a wireless connection between a first transceiver in a trailer vehicle (12) having an electronic braking system and at least one second transceiver outside of the trailer vehicle (12) is disclosed. The first transceiver is assigned to an electronic control unit (14, 22) in the trailer vehicle (12), which is coupled to a tractor vehicle (10) and a wired connection (15, 16, 17) exists. In the method, a) a trigger signal is generated in the tractor vehicle (10) and transmitted the control unit (14, 22); b) the first transceiver establishes a preliminary connection to the at least one second transceiver, c) the at least one second transceiver indicates via an output unit the preliminary connection, and d) if conditions are met, a permanent connection between the first transceiver and the second transceiver is established.

16 Claims, 1 Drawing Sheet

(51) Int. Cl.
*B60T 8/17* (2006.01)
*H04W 12/06* (2009.01)
*H04W 76/00* (2018.01)
*B60T 7/16* (2006.01)
*H04W 76/10* (2018.01)
*H04W 12/08* (2009.01)
*H04L 29/08* (2006.01)
*B60T 8/171* (2006.01)

(56) References Cited

U.S. PATENT DOCUMENTS

| | | | |
|---|---|---|---|
| 2005/0062590 A1* | 3/2005 | Lang | B60D 1/62 340/431 |
| 2007/0038346 A1* | 2/2007 | Ehrlich | G07C 5/008 701/31.4 |
| 2008/0227411 A1* | 9/2008 | Martinez | B60D 1/62 455/90.1 |
| 2009/0076666 A1 | 3/2009 | Schneider et al. | |
| 2011/0215901 A1 | 9/2011 | Van Wiemeersch et al. | |
| 2012/0146779 A1 | 6/2012 | Hu et al. | |
| 2013/0325209 A1* | 12/2013 | Cooper | B60T 7/20 701/2 |
| 2015/0025766 A1* | 1/2015 | Mederer | B60T 8/1708 701/70 |
| 2015/0339334 A1 | 11/2015 | Hanke | |
| 2017/0088104 A1* | 3/2017 | Risse | H04W 12/08 |

FOREIGN PATENT DOCUMENTS

| | | |
|---|---|---|
| DE | 102012012565 A1 | 12/2013 |
| WO | WO2013124730 A1 | 8/2013 |

OTHER PUBLICATIONS

English language abstract and machine translation for DE10255301 (A1) extracted from http://worldwide.espacenet.com database on Aug. 12, 2016, 11 pages.

* cited by examiner

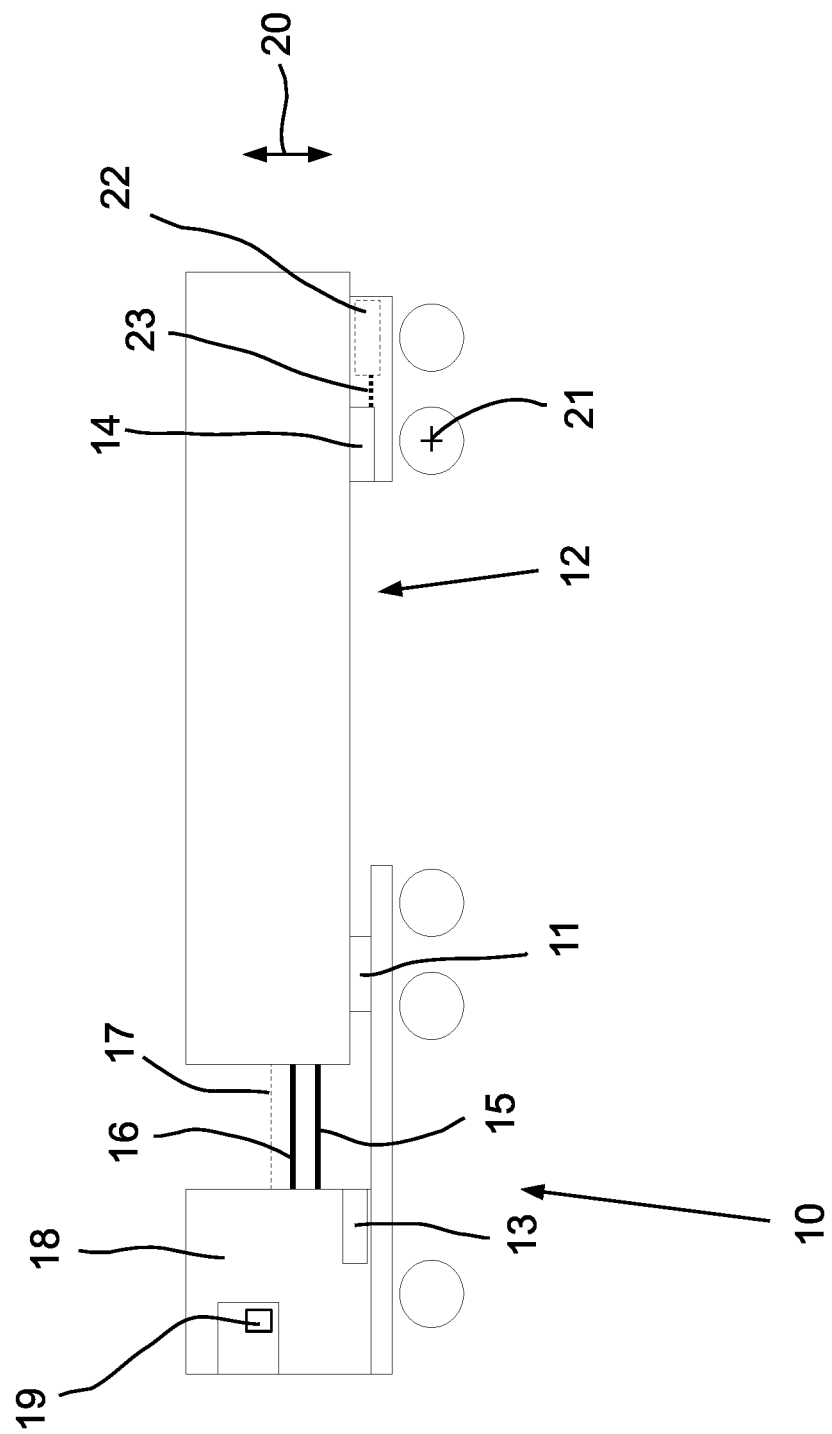

METHOD FOR ESTABLISHING A WIRELESS CONNECTION

CROSS-REFERENCE TO RELATED APPLICATIONS

This application is the National Stage of International Application No. PCT/EP2015/000468, filed on 27 Feb. 2015, which claims priority to and all advantages of German Patent Application No. 10 2014 004 182.4, filed on 22 Mar. 2014, the content of which is hereby incorporated by reference.

FIELD OF THE INVENTION

The invention generally relates to a method for establishing a wireless network and, more specifically, to a method for establishing a wireless network between a first transceiver in a trailer vehicle and at least one second transceiver outside of the trailer vehicle.

BACKGROUND OF THE INVENTION

An electronic control unit for activating the brakes and for exercising further functions is typically included in a vehicle with an electronic brake system. For this purpose, sensors and electromagnetic control valves are connected to the control unit. In addition, the control unit receives data by means of a CAN bus system or other data connection.

The transmission of control commands, the reading out of information and/or a configuration of the control unit are carried out by means of the data connection. For example, the angular position of a brake pedal for the operating brake is transmitted by means of the data connection. The control unit also signals the activity of an anti-lock function or selected sensor data to suitably located display units, for example in a driver's cab, by means of the data connection. Essentially, the driver in the driver's cab communicates with the control unit using provided displays and operating elements.

Trailer vehicles with electronic brake systems also comprise an electronic control unit, essentially with the aforementioned functions. Trailer-specific functions are also possible, for example automatic braking interventions in the event of unstable driving states or to prevent such states. Between the tractor vehicle and the trailer vehicle there are standardized connections that have to be plugged in when coupling the trailer vehicle, namely two pneumatic connections (supply pressure and control pressure) and an electrical connection that includes the data connection.

One hundred percent compatibility is desirable regarding the possibility to display the data from the control unit of the trailer vehicle and to influence the control unit of the trailer vehicle on the one hand with the relevant functions in the tractor vehicle on the other hand. In practice, such compatibility is not possible because trailer vehicles and tractor vehicles are arranged differently. Owing to different manufacturers and the user-selected functionalities, the control units in the trailer vehicle and tractor vehicle have different properties. Therefore, the provision of a display and operating unit for the driver is desirable, wherein the unit is connected to the control unit of the trailer vehicle.

When coupling the trailer vehicle to the tractor vehicle, confusion regarding the identity of the trailer vehicle must be avoided. In particular in large depots, identity confusion regarding the trailer vehicles can occur. More important is the definite identification of the trailer vehicle by the driver. The measures necessary for this should be able to be carried out rapidly and simply.

From WO 2013/124730 A1, it is known to couple a WLAN-compatible cell phone of the driver to the control unit of the trailer vehicle by means of a WLAN connection or a different wireless connection. In order to avoid an unwanted connection, such as to the smartphone of a driver that wants to pick up a different trailer vehicle, a list of permitted MAC addresses can be stored in a memory in the trailer vehicle. The MAC addresses are unique identifiers of WLAN-compatible terminals. Moreover, the trailer vehicle can transmit its own vehicle number and an SSID identifier of its own WLAN module. Confusion is however only excluded with the method if the driver makes additional entries to the smartphone or only a single MAC Address is stored in the memory of the trailer vehicle.

SUMMARY OF THE INVENTION

One object of the present invention is a method for establishing a wireless connection between a trailer vehicle and at least one second transmitter-receiver outside of the vehicle, e.g. a user's smartphone, in combination with a very simple and definite verification of a subscriber to the connection. In this embodiment, the elaborate input of a multi-digit identification number is to be avoided.

In the method, a wireless connection is established between a first transmitter-receiver in a trailer vehicle with an electronic brake system (EBS) and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection, through which signals can be transmitted from the tractor vehicle to the trailer vehicle. According to the invention, the method comprises the following steps:

a) a trigger signal is generated in the tractor vehicle and transmitted by a wired connection to the control unit in the trailer vehicle, b) following the input of the trigger signal into the control unit of the trailer vehicle, the first transmitter-receiver establishes a provisional connection to the at least one second transmitter-receiver, c) the at least one second transmitter-receiver indicates the provisional connection or a different type of confirmation request by way of an output unit, and d) if a signal arrives in the trailer vehicle as the acknowledgement of the confirmation request within a defined time period—by wired connection and/or wirelessly—a continuous connection between the first transmitter-receiver and the second transmitter-receiver is established.

The trigger signal may be the switch-on of the ignition in the tractor vehicle by the driver, whereas the remaining steps—with the exception of the confirmation—may be automated by suitable software of the control unit. The control unit in the trailer vehicle detects the switch-on of the ignition and passes the information to the first transmitter-receiver. The latter searches the surroundings for wirelessly contactable transmitter-receivers, that is for at least one second transmitter-receiver, and establishes a provisional connection with at least one second transmitter-receiver. The second transmitter-receiver indicates the provisional connection or an explicit confirmation request.

The second transmitter-receiver may be the driver's smartphone. Here a smartphone means in particular a portable wireless telephone with a communications interface. The driver transmits a confirmation signal within a defined time period after detection of the confirmation request. If the driver observes the time period, the first transmitter-receiver and the second transmitter-receiver assume that the respective other communications partner is the correct one. The provisional connection changes to a continuous connection, which continues until further notice. If the time period is not met, the connection between the first transmitter-receiver and the second transmitter-receiver is terminated.

Advantageously, WLAN-compatible and/or Bluetooth-compatible modules or units may be used as the transmitter-receivers. Methods and protocols for WLAN connections and Bluetooth connections are known and standardized, even from different application areas, for example the connection of the smartphone to a home network according to the WLAN standard 802.11.

As the transmitter-receiver outside of the trailer vehicle, a cellular-compatible unit with at least the cellular technology GSM is advantageously used. Alternatively, more modern or different cellular techniques can be used, such as UMTS or LTE etc.

The use of a smartphone as a second transmitter-receiver is particularly advantageous. The smartphone is generally WLAN-compatible and Internet-compatible. A special software, an application ("app") that matches the functions of the control unit in the trailer vehicle, and which can for example be provided by the manufacturer of the control unit, is installed on the smartphone. The manufacturer of the control unit thereby does not have to provide any special hardware for the driver. A WLAN-compatible and preferably also Internet-compatible smartphone and executed software, with which the data from the trailer vehicle can be displayed and/or functions in the trailer vehicle can be controlled, are sufficient.

Advantageously, the control unit provided for the electronic brake system may be used as the control unit. The first transmitter-receiver is integrated as a module in the control unit or is connected to the control unit as an external module. The internal or external module is in particular a WLAN module. The external module can also be a component of a further control unit.

According to the invention, switching on the ignition on the tractor vehicle can be used as the trigger signal. With the trailer vehicle coupled, the trigger signal is transmitted to the control unit in the trailer vehicle by means of a data line (CAN bus, powerline connection or a different data connection).

Preferably the time period for the input of the signal for the confirmation is 15 seconds or less, e.g. five to ten seconds. Owing to the specified time period, later actions, in particular of different transmitter-receivers, are no longer accepted.

According to a further embodiment of the invention, the signal for the confirmation can be derived from the operation of an operating unit disposed in the driver's cab of the tractor vehicle. The operating unit in the driver's cab is connected to the trailer vehicle by means of a suitable line in the tractor vehicle, for example by means of a data connection, an electrical connection, a pneumatic line (supply pressure, control pressure) or in a different way. An operating unit in the driver's cab can also be used to output and transmit the trigger signal. The control unit in the trailer vehicle just has to be adjusted for this.

According to the invention, the confirmation signal can be derived from the operation of a foot brake pedal. The operation of the foot brake pedal typically has at least two effects, namely a change in the pneumatic control pressure and the operation of the electric brake light. If the brake light signal is transmitted by means of a suitable line to the trailer vehicle, the same can be analyzed by the control unit of the trailer vehicle as a confirmation signal. This applies similarly to a change of the control pressure. The change can be detected by a sensor associated with the control unit of the trailer vehicle.

According to a further embodiment of the invention, the confirmation signal can be derived from the release and reapplication of a parking brake. The driver at least partly releases the parking brake in the tractor vehicle and then reapplies the parking brake. The confirmation signal results from the lowering or increasing of the control pressure in the trailer vehicle associated therewith.

Likewise, it is within the scope of the invention if the confirmation signal is derived from an input to the second transmitter-receiver and a wireless transmission of the input to the first transmitter-receiver. The second transmitter-receiver is typically equipped with a display screen. The request for confirmation appears on the display screen. The operator confirms within the predetermined time period by a simple input. The input may also possibly be a personal PIN number that the driver has received for example together with the driver's contract for receiving the trailer vehicle.

According to a further embodiment of the invention, when the trigger signal is input a check is made as to whether a supply pressure in the trailer vehicle is still below a limit value, e.g. less than 6 bar. If the supply pressure is below the limit value, the confirmation request is only issued if the trailer vehicle has a supply pressure greater than a limit value, e.g. greater than 6 bar.

According to the invention, it can furthermore be provided that a continuous connection is not established or maintained if confirmation signals from more than a second transmitter-receiver arrive in the trailer vehicle within the defined time period. Preferably, the end of the time period is awaited and a continuous connection to the second transmitter-receiver is only established if no further second transmitter-receivers are detected. Alternatively, after the expiry of the time period the already established continuous connection is cut off again once a further second transmitter-receiver is detected.

Advantageously, following the input of confirmation signals from more than one second transmitter-receiver, a new time period is started and a new confirmation is awaited. For this purpose, either the already output request for confirmation remains or a new request appears at the second transmitter-receiver.

Finally, the invention also provides a control unit for a trailer vehicle with an electronic brake system and for performing the method. An internal or external transmitter-receiver is associated with the control unit. Moreover, the control unit comprises the necessary software for the described functions of the method.

BRIEF DESCRIPTION OF THE DRAWINGS

The invention is described in greater detail below with reference to the accompanying drawing FIGURES, in which:

FIG. 1 shows a road train with a semi-trailer, namely a tractor vehicle 10 with a saddle 11 and a trailer vehicle 12. The tractor vehicle 10 and the trailer vehicle 11 are each fitted with an electronic brake system for a pneumatic brake system. An electronic control unit for the electronic brake system is provided in both vehicles, namely a control unit 13 in the tractor vehicle and a control unit 14 in the trailer vehicle.

DETAILED DESCRIPTION

When coupling the trailer vehicle 12 to the tractor vehicle 10, at least three line connections are established, namely a pneumatic control pressure connection 15, a pneumatic supply pressure connection 16 and an electrical connection 17. The electrical connection 17 contains among other things a line for a brake light signal of the tractor vehicle and optionally a line for a CAN data bus system. The latter can also be the subject of a dedicated fourth line connection.

The two control units 13, 14 receive signals from connected sensors, in particular wheel revolution rate sensors, lateral acceleration sensors, pressure sensors etc. Moreover, the control units 13, 14 are connected to the CAN data bus (not shown). Operating units and display elements for the driver are provided in the driver's cab 18, with which the driver directly or indirectly influences the vehicle and the control units 13, 14, e.g. a foot brake pedal, a hand brake lever, switches for electrical or pneumatic consumers etc. (not shown in each case).

In this embodiment, the driver has a smartphone 19 that can be Internet-compatible and can establish a WLAN connection. An app is installed on the smartphone 19 as software with which the control unit 14 in the trailer vehicle 12 can be addressed.

The control unit 14 is equipped with a WLAN module and can communicate with the smartphone 19 by means of the module. Special functions that are tailored to the trailer vehicle 12 are implemented in the control unit 14, for example for raising or lowering overall, see double arrow 20, or for raising or lowering a lift axle 21. Pneumatic final control elements can be activated in a known manner for this purpose by the control unit 14. Moreover, sensors are connected to the control unit 14, which for example give information about axle loads, tire pressures and the chassis tilt angle relative to the axles. The data can be stored in the control unit 14, as can further data such as stored fault messages.

The WLAN module can also be installed in a further control unit 22 and can communicate with the control unit 14 via a data interface, for example a CAN data bus 23.

The driver can conveniently carry out the reading of the information on the one hand and exercise the described functions on the other hand from the driver's cab via the smartphone. For this purpose, only the app on the smartphone as well as a wireless connection between the smartphone and the control unit 14 or the further control unit 22 of the trailer vehicle 12 are utilized. In order to avoid confusion and for verification of the WLAN connection, the driver carries out the following steps in succession:

a) the trailer vehicle 12 is coupled to the tractor vehicle 10 and the connections 15, 16 and 17 are established.

b) The driver switches on the ignition on the tractor vehicle 10.

c) The control unit 14 (or 22) detects the switched-on ignition of the tractor vehicle 10 and transmits a confirmation request via the WLAN module thereof. For this purpose, the WLAN module transmits the confirmation request to all transmitter-receivers that can be reached and thus establishes a provisional connection. At the same time the WLAN module of the control unit 14 (or 22) starts a time period of five seconds.

d) The smartphone 19 shows the confirmation request. If further smartphones with suitable software are in the vicinity, the same also show the confirmation request.

e) The driver depresses the foot brake within the time period of five seconds.

f) The driver can additionally enter a confirmation into the smartphone 19 if appropriate or desired.

g) The brake light signal passes to the trailer vehicle 12 and to the control unit 14 (or 22) by means of the electrical connection 17. The control unit 14 (or 22) accepts the confirmation and establishes a continuous WLAN connection to the smartphone 19. It is thereby ensured that the "correct" driver has access to the control unit 14 (or 22) of the trailer vehicle 12 with the smartphone.

h) Alternatively, instead of the electric brake light signal the rise of the pneumatic control pressure in the trailer vehicle can also be analyzed by sensors.

Depending on the configuration of the electric connection 17, transmission of the brake light signal may not even be provided. In this case, the driver does not operate the foot brake in step e), but at least partly releases the parking brake in the tractor vehicle once and applies it again. As a result, a change of the supply pressure occurs, which can be read out by the control unit 14 (or 22) by means of sensors and can thus be understood as confirmation. In this case it is preferably provided that the confirmation request according to step c) is only transmitted if there is a supply pressure greater than, for example, 6 bar in the trailer vehicle.

According to a further alternative embodiment, step f) is mandatory, i.e. the driver must also acknowledge the confirmation request on the smartphone. If the control unit 14 (or 22) receives more than one confirmation within the provided time period of for example 10 seconds, all acknowledgements are declared invalid and a further attempt is started. The continuous WLAN connection is only established if only one confirmation arrives within the time period.

A further alternative is that the driver only enters a PIN code as a confirmation via the smartphone. This can be useful if the driver does not remain in the driver's cab. The driver has obtained the PIN code for example together with the driver's contract for receiving the trailer vehicle 12.

What is claimed is:

1. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:

a) generating in the tractor vehicle a trigger signal and transmitting by cable the trigger signal to the electronic control unit in the trailer vehicle, wherein the trigger signal comprises switching on the ignition on the tractor vehicle, b) establishing by the first transmitter-receiver a provisional connection with the at least one second transmitter-receiver, c) indicating by the at least one second transmitter-receiver the provisional connection or a different type of confirmation request via an output unit, and d) establishing a continuous connection between the first transmitter-receiver and the at least one second transmitter-receiver if a confirmation signal arrives in the trailer vehicle as an acknowledgement of the confirmation request within a defined time period.

2. The method as claimed in claim 1, wherein the transmitter-receivers independently comprise WLAN-compatible modules and/or Bluetooth-compatible modules.

3. The method as claimed in claim 1, wherein the transmitter-receivers independently comprise GSM-compatible modules or different cellular system-compatible modules.

4. The method as claimed in claim 1, wherein a smartphone is used as the second transmitter-receiver.

5. The method as claimed in claim 4 wherein the smartphone includes software for displaying data from the trailer vehicle.

6. The method as claimed in claim 1 wherein the control unit comprises a brake control unit.

7. The method as claimed in claim 1, wherein the confirmation signal is derived from an operation of an operating unit disposed in a driver's cab of the tractor vehicle.

8. The method as claimed in claim 1, wherein the confirmation signal is derived from an input to the second transmitter-receiver and the wireless transmission of the input to the first transmitter-receiver.

9. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:
  a) generating in the tractor vehicle a trigger signal and transmitting by cable the trigger signal to the electronic control unit in the trailer vehicle,
  b) establishing by the first transmitter-receiver a provisional connection with the at least one second transmitter-receiver,
  c) indicating by the at least one second transmitter-receiver the provisional connection or a different type of confirmation request via an output unit, and
  d) establishing a continuous connection between the first transmitter-receiver and the at least one second transmitter-receiver if a confirmation signal arrives in the trailer vehicle as an acknowledgement of the confirmation request within a defined time period, wherein the time period for the input of the confirmation signal is up to 15 seconds.

10. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:
  a) generating in the tractor vehicle a trigger signal and transmitting by cable the trigger signal to the electronic control unit in the trailer vehicle,
  b) establishing by the first transmitter-receiver a provisional connection with the at least one second transmitter-receiver,
  c) indicating by the at least one second transmitter-receiver the provisional connection or a different type of confirmation request via an output unit, and
  d) establishing a continuous connection between the first transmitter-receiver and the at least one second transmitter-receiver if a confirmation signal arrives in the trailer vehicle as an acknowledgement of the confirmation request within a defined time period, wherein the confirmation signal is derived from the operation of a foot brake pedal.

11. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:
  a) generating in the tractor vehicle a trigger signal and transmitting by cable the trigger signal to the electronic control unit in the trailer vehicle,
  b) establishing by the first transmitter-receiver a provisional connection with the at least one second transmitter-receiver,
  c) indicating by the at least one second transmitter-receiver the provisional connection or a different type of confirmation request via an output unit, and
  d) establishing a continuous connection between the first transmitter-receiver and the at least one second transmitter-receiver if a confirmation signal arrives in the trailer vehicle as an acknowledgement of the confirmation request within a defined time period, wherein the confirmation signal is derived from the release and reapplication of a parking brake.

12. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:
  a) generating in the tractor vehicle a trigger signal and transmitting by cable the trigger signal to the electronic control unit in the trailer vehicle,
  b) establishing by the first transmitter-receiver a provisional connection with the at least one second transmitter-receiver,
  c) indicating by the at least one second transmitter-receiver the provisional connection or a different type of confirmation request via an output unit, and
  d) establishing a continuous connection between the first transmitter-receiver and the at least one second transmitter-receiver if a confirmation signal arrives in the trailer vehicle as an acknowledgement of the confirmation request within a defined time period, wherein on the input of the trigger signal a supply pressure in the trailer vehicle is checked, and if at the input of the trigger signal the supply pressure in the trailer vehicle is less than a limit value, the confirmation request is only made if the trailer vehicle has a supply pressure above the limit value.

13. The method as claimed in claim 12 wherein the limit value is less than or equal to 6 bar.

14. A method for establishing a wireless connection between a first transmitter-receiver in a trailer vehicle with an electronic brake system and at least one second transmitter-receiver outside of the trailer vehicle, wherein the first transmitter-receiver is associated with an electronic control unit in the trailer vehicle, and wherein the trailer vehicle is coupled to a tractor vehicle and there is a wired connection through which signals can be transmitted from the tractor vehicle to the trailer vehicle, said method comprising the following steps:

a) generating in the tractor vehicle a trigger signal and transmitting by cable the trigger signal to the electronic control unit in the trailer vehicle, b) establishing by the first transmitter-receiver a provisional connection with the at least one second transmitter-receiver, c) indicating by the at least one second transmitter-receiver the provisional connection or a different type of confirmation request via an output unit, and d) establishing a continuous connection between the first transmitter-receiver and the at least one second transmitter-receiver if a confirmation signal arrives in the trailer vehicle as an acknowledgement of the confirmation request within a defined time period, wherein a continuous connection is not established if confirmation signals from more than one second transmitter-receiver arrive in the trailer vehicle within the defined time period.

15. The method as claimed in claim 14, wherein following the input of confirmation signals from more than one second transmitter-receiver, a new time period is started and a new confirmation is awaited.

16. A control unit for a trailer vehicle with an electronic brake system and for performing the method as claimed in claim 1.

* * * * *